United States Patent Office 3,557,606
Patented Jan. 26, 1971

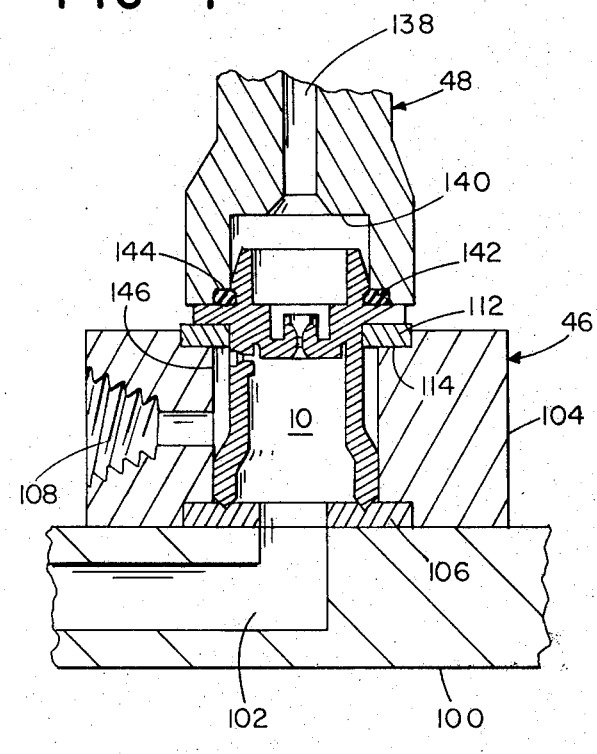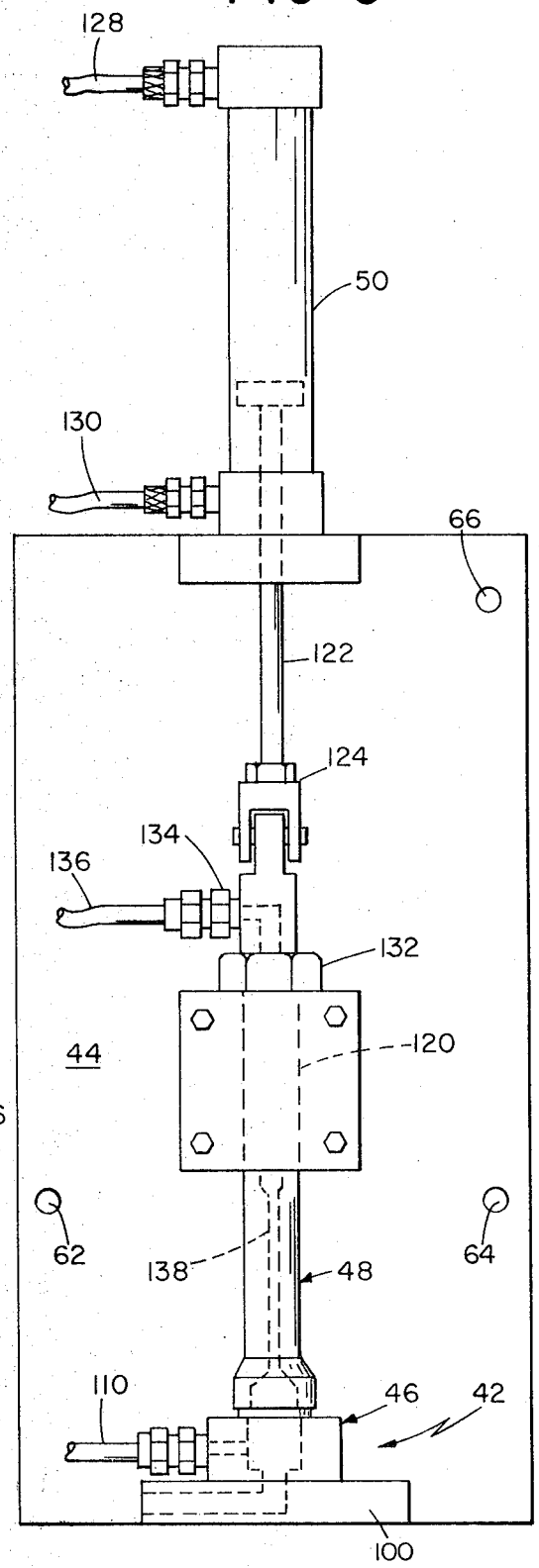

3,557,606
GAUGING SYSTEM
Joseph Thomas Markey, Providence, R.I., assignor to The Gillette Company, Boston, Mass., a corporation of Delaware
Filed Sept. 25, 1968, Ser. No. 762,571
Int. Cl. G01b 13/08
U.S. Cl. 73—37.8
12 Claims

ABSTRACT OF THE DISCLOSURE

A dimensional gauging system for gauging selected dimensions of a workpiece includes a workpiece holder adapted to receive a workpiece that has a plurality of dimensions to be simultaneously gauged. The workpiece holder has a plurality of inlet fluid passages, which are disposed to direct fluid flow to different portions of the workpiece for simultaneously gauging the several selected dimensions thereof. A plurality of pressure gauging elements are provided for simultaneously gauging each of the selected dimensions as functions of the fluid pressures in the fluid passages, each of the plurality of pressure gauging elements being connected to a corresponding one of the inlet passages.

SUMMARY OF INVENTION

This invention relates to fluid gauging systems and more particularly to fluid gauging systems for accurately checking the dimensions of small passages in a workpiece.

It is frequently desirable to check rapidly and yet accurately the dimensions of articles, particularly in connection with devices that are being produced in large quantities. A particular problem arises in connection with the checking of orifices in valve construction in which two orifices are proportioned to provide the desired proportions of mixture of two chemical reactants. Such a valve structure is disclosed in the co-pending application Ser. No. 716,827 now Pat No. 3,454,198 entitled "Dispensing Device" filed Mar. 28, 1968 and assigned to the same assignee as this application. The dispensing device disclosed in that patent application employs a valve structure that has two orifices which control the relative proportions of an oxidant and a reductant. The manufacturing tolerances for these orifices are ±0.0003 inch. Due to the critical characteristics of these orifices, each component must be checked to determine whether it is within tolerances. As the orifices are very small, the smaller being 0.014 inch in diameter, mechanical gauging techniques are difficult to employ. Further, it is desirable to provide a gauging environment which establishes conditions comparable with those encountered in the end use of the workpiece. This gauging should be rapid and accurate, easy to operate and provide consistent measurements. Preferably, all the relevant dimensions of the workpiece should be gauged simultaneously.

Accordingly, it is an object of this invention to provide novel and improved systems for the rapid and accurate dimensional gauging of a workpiece.

Another object of the invention is to provide a novel and improved system for the simultaneous pneumatic gauging of a plurality of dimensions.

Another object of the invention is to provide a novel and improved pneumatic gauging system of simplified design which permits an unskilled operator to operate accurately and safely.

Another object of the invention is to provide novel and improved fluidic control systems for use with pneumatic gauging systems.

Still another object of the invention is to provide novel and improved workpiece holding systems for use in pneumatic gauging systems.

A particular object of the invention is to provide a gauging system for gauging the relative and absolute dimensions of two small flow control orifices of a valve component.

The invention features a pneumatic clamping structure and a base structure for holding the workpiece. A plurality of pressure fluid passages directs flow of pressure fluid to a plurality of selected dimensions of a held workpiece. Pressure gauge means simultaneously gauge the plurality of selected dimensions as functions of the fluid pressures within the plurality of fluid passages. A fluidic circuit directs the flow of pneumatic pressure fluid to the pneumatic clamping structure, controlling the holding and releasing of the workpiece. A regulated filtered pressure fluid source provides pressure fluid to the plurality of fluid passages and to the pneumatic clamping structure and fluidic circuit.

In a particular embodiment two flow control orifices of a valve component, the dimensions of which are critical in relative as well as absolute terms, are gauged through the use of differential pressure gauging techniques. A support clamps the valve component and air is flowed through the valve in the same direction as in its intended use. Two differential gauging assemblies, each including a master orifice and a zero adjust orifice, meter the flow through each valve orifice. Fluidic circuits, operative from the same pressure source as the gauging assemblies, is manually actuated to control the clamping of the valve component. The apparatus provides accurate gauging of related orifices in an easy to operate and reliable arrangement.

Other objects, features and advantages of the invention will be seen as the following description of a particular embodiment of the invention progresses, in conjunction with the drawings, in which:

FIG. 3 is a side elevational view of the clamping structure employed in the gauging system shown in FIG. 2;

FIG. 4 is an enlarged sectional view of a portion of the clamping structure shown in FIG. 3.

DESCRIPTION OF PARTICULAR EMBODIMENT

Figure 1:
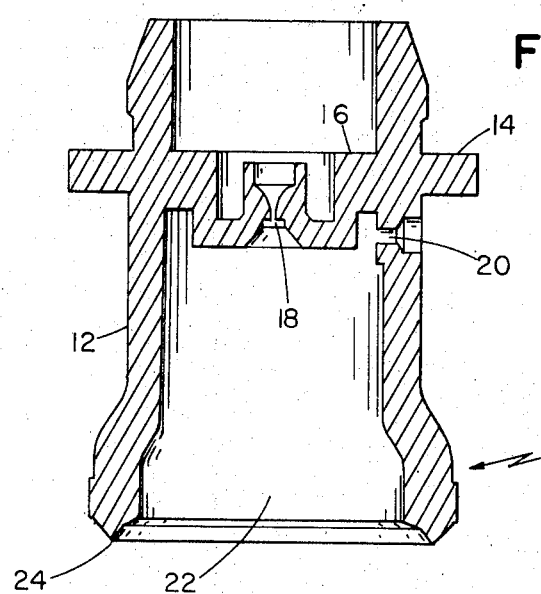
FIG. 1 is a sectional view of a valve component to be checked with gauging apparatus constructed in accordance with the invention.

With reference to FIG. 1, the valve component 10 of the dispensing device disclosed in the afore-mentioned patent application Ser. No. 716,827, now Pat. No. 3,454,198 includes a cylindrical housing 12 about ¾ inch in length and ½ inch in diameter, from which extends flange 14, 0.640 inch in diameter. Barrier 16 in housing 12 is located in substantially the same plane as flange 14 and defines an orifice structure 18, which has a curved inlet passage and terminates in a gauging dimension of 0.014 inch. A second orifice 20, in the wall of the housing 12 immediately below flange 14, has a dimension of 0.027 inch. The housing below barrier 16 defines a mixing chamber 22 and terminates in a ridged end surface 24. In the valve assembly, a first chemical reactant is supplied under pressure through orifice 18 to chamber 22 and a second chemical reactant is similarly supplied through orifice 20. As the dimensions of these two orifices determine the proportions of the chemical reactants as they are mixed, these dimensions are critical, and in a preferred embodiment have tolerances of ±0.0003 inch.

Figure 2:
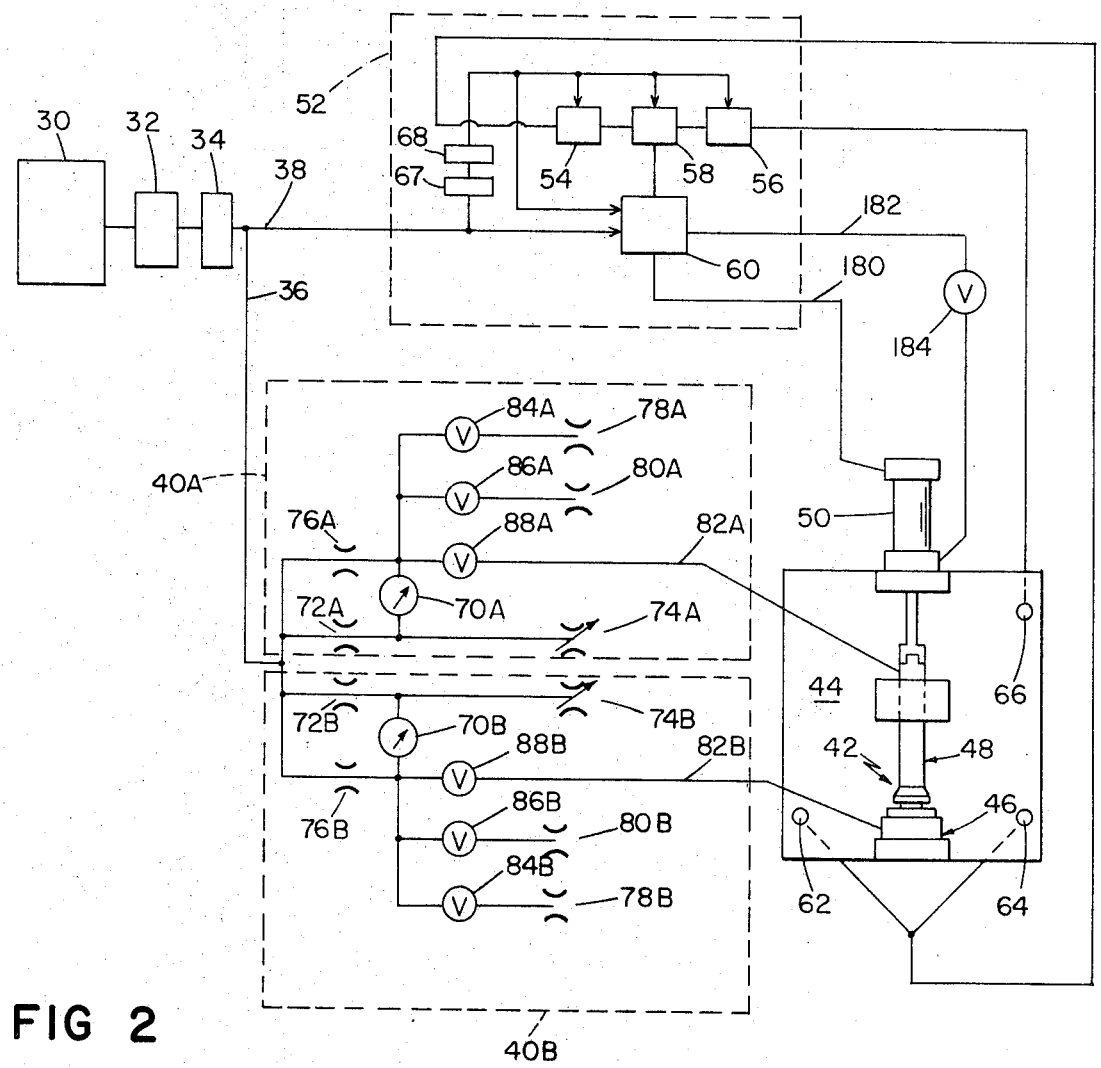
FIG. 2 is a control diagram of a pneumatic gauging system constructed in accordance with the invention for checking the valve component shown in FIG. 1.

A gauging system for checking the sizes of these two orifices is indicated in FIG. 2. This gauging system includes a fluid pressure source 30 which is applied through a filter 32 and a regulator 34 to provide a 60 to 70 p.s.i.g. pressure in lines 36 and 38. Line 36 is connected to two gauging assemblies 40A and 40B which in turn are connected to workpiece positioning structure 42 mounted on support structure 44. That positioning structure includes holder 46 and clamping shaft 48 that is mounted for vertical movement under the control of pneumatic cylinder 50. The position of cylinder 50 is controlled by fluidic control circuit 52 to which air is applied over line 38. This fluidic control circuit includes two gate components 54, 56, a flip-flop component 58 and a control valve component 60. Manual control of this fluidic circuit is by means of sensors 62, 64 and 66 on the workpiece support structure 44.

Two gauging assemblies are provided in system 40, each assembly including a differential pressure meter 70, a reference control orifice 72, a zero adjust orifice 74; and a gauge control orifice 76, two master orifices 78, 80, and a gauge output line 82, which is connected to the workpiece. Control valves 84–88 permit the selective opening of one of the three lines to the master or workpiece orifices for gauging purposes.

Additional details of the workpiece positioning structure may be seen with reference to FIGS. 3 and 4. The holder structure 46 includes a base 100 which has an exhaust passageway 102. Mounted on base 100 is block 104 which secures a seal disc 106 in position in alignment with the exhaust passage 102. Block 104 has a threaded connection 108 which is adapted to be connected to gauge line 82b via flexible connection 110. A second seal disc 112 is received in recess 114 in the upper surface of block 104 so that disc 112 is in coaxial relation with disc 106. The valve component 10 is adapted to be positioned in block 104 with the lower end surface 24 resting on seal member 106 and the flange 14 resting on seal member 112 as shown in FIG. 4.

Cooperating with workpiece holder 46 is clamp shaft 48 which is supported for movement in bearing 120 and is connected to piston rod 122 of cylinder 50 by means of coupling 124. Cylinder 50 has a connection 128 at its upper end which is coupled to one output of valve circuit 60 in the fluidic control circuit 52 and a connection 130 at its lower end which is coupled to a second output of that valve circuit. The clamp shaft 48 carries a stop nut 132 which cooperates with bearing structure 120 to provide an adjustable positioning control for the clamp shaft 48 in its lower position. Internal passage 138 in clamp shaft 48 is connected by means of coupling 134 and flexible connection 136 to gauge line 82A. Passage 138 terminates in an enlarged chamber 140 at the foot of the clamp shaft, and adhered to the foot of the clamp shaft in recess 142 is a sealing O-ring 144. This O-ring, when shaft 48 is in its lower position, engages and provides a seal with the upper surface of flange 14 of the valve component 10. Thus in the clamping position shown in FIG. 4, O-ring 144 seals the chamber 140 so that the orifice 18 of the workpiece defines an outlet orifice connected to line 82A. A second chamber 146 is defined between seals 106 and 112 which is connected to gauge line 82B via line 110 and which has as its outlet orifice the valve orifice 20. Both of these valve orifices are connected to atmosphere through the large exhaust port 102.

Figure 5:
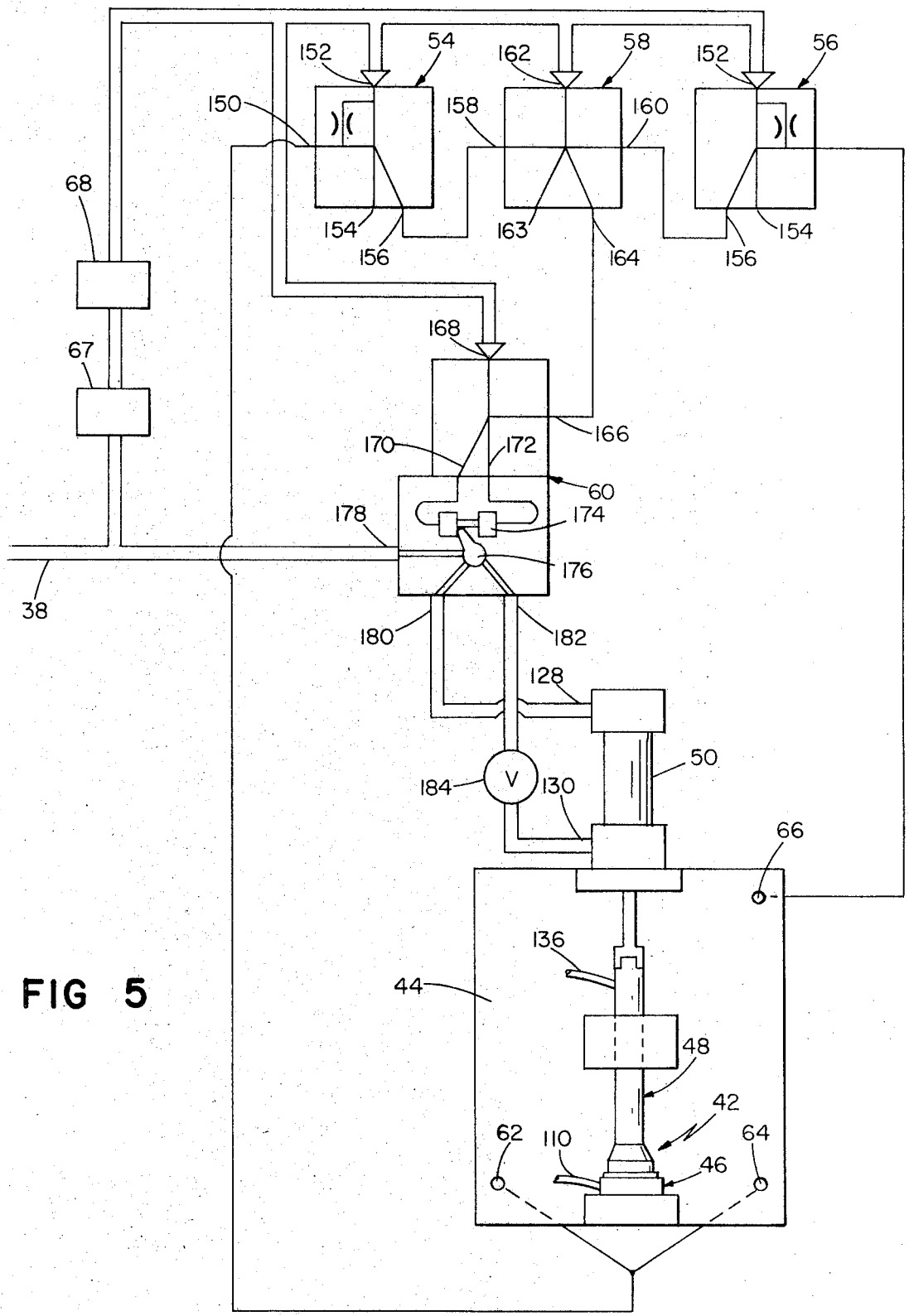
FIG. 5 is a schematic diagram of the fluidic control circuit employed in the gauging system shown in FIG. 2.

Additional details of the fluidic control system may be seen with reference to FIG. 5. As there indicated, relatively high pressure air is applied over line 38 directly to the control valve structure 60. A five micron filter 67 applies air to regulator 68 which drops the pressure to 10 p.s.i.g. That reduced fluid pressure is applied to the fluidic control elements 54, 56, 58 and 60. Gates 54 and 56 each have a control port 150, a fluid inlet portion 152, and two fluid outlet ports 154, 156. Flip-flop 58 has two control ports 158, 160, a fluid inlet port 162 and two outlet ports 163, 164. The control valve unit 60 has a control port 166, a fluid inlet port 168 and two fluid outlet ports 170, 172. Also mounted in the housing of the control valve unit is a piston 174 which moves valve member 176 in a valve structure which includes an inlet port 178 and two outlet ports 180, 182.

In operation, a first master orifice 78A of 0.0143 inch diameter and a second master orifice 80A of 0.0137 inch diameter are inserted in the upper gauging system 40A and similar master orifices 78B and 80B of dimension 0.0273 and 0.0267 are inserted in the lower gauging system 40B (the tolerances of these master orifices being ±0.00003 inch). Air pressure is then applied to the system and the meters 70A and 70B are calibrated. Valves 84, 86 and 88 are normally closed. When valve 84 is opened, meter 70 indicates a positive value which is marked on the meter scale. Valve 84 is then closed and valve 86 opened and the meter indicates a corresponding negative value which is marked on the meter scale. Thus upper and lower gauge limits are known to the operator. A throttling adjustment is associated with orifice 74 to permit zero adjust of meter 70 if indicated values are not equidistant on either side of zero. Valve 86 is then closed and valve 88 opened. The upper valving system 40A is thus calibrated for gauging of orifice 18 of the workpiece. Similar calibration adjustment of the lower gauging system 40B is similarly calibrated for gauging of orifice 20.

After calibration, a workpiece is placed in base 104 in seated relation with seal members 106, 112. Both control sensors 62 and 64 are covered and that action changes the air flow to control port 150 of gate 54 and operates that gate to transfer the air flow from outlet port 154 to outlet 156 so that air flow is applied to control port 158 of flip-flop 58. The application of air pressure at port 158 transfers the air flow through flip-flop 58 from outlet port 162 to outlet port 164 which in turn pressurizes control port 166 of the control valve structure. Air pressure at that point shifts air flow from port 172 to port 170 which slides piston 174 to the right, producing clockwise rotation of valve element 176 and applying air from line 38 through the valve structure to the output port 180 to connector 128 at the upper end of cylinder 50 to move the clamp shaft 48 downwardly in a clamping operation to the position shown in FIG. 4. In this position orifices 18 and 20 function as gauging orifices, the dimensions of which are indicated on meters 70a and 70b, respectively, in terms of the master orifices 78 and 80 as calibrated on the meters.

Thus gauging is accomplished with fluid pressure flow direction being the same as the operating conditions with the chemical reactant materials. After gauges have been read, sensor 66 is covered, changing the air flow to the control port of gate 56 and thus transferring the fluid flow through that gate to output port 156 for application to control port 160 of flip-flop 58. Application of fluid pressure at that control port transfers the fluid flow through flip-flop 58 to outlet port 162, removing the holding condition from the control valve control 60 so that the fluid flow returns to outlet port 172 to move piston 174 to the left thus rotating the valve element 176 in the counterclockwise direction to apply main fluid flow to outlet port 182 and throttling needle valve 184, to connector 130 at the lower end of cylinder 50, to raise the clamp shaft 48 so that the gauged workpiece can be removed and another inserted for gauging. The main purpose of needle valve 184, is to throttle the exhaust from 130 to prevent damaging the workpece during the clamping operation.

Thus this system permits pneumatic gauging of multiple orifice workpieces in a manner coordinated with the flow conditions through the workpieces, which system can be operated from a common fluid source easily and rapidly. It will be obvious to those skilled in the art that other types of workpiece configurations having different numbers and types of dimensions to be gauged may be similarly gauged and fluids other than air may be used in such gauging. Other modifications will also be apparent to those skilled in the art. For example, where several such gauging systems are in use satisfactory workpieces may be employed in place of the master orifices 78 and 80. Also, other workpiece holder actuating systems may be employed. Therefore it is not intended that the invention be limited to the disclosed embodiment or to details thereof and departures may be made therefrom within the spirit and scope of the invention.

What is claimed is:

1. A dimensional gauging system for simultaneously gauging a plurality of flow control channels of a workpiece comprising:

a workpiece holder, said holder including a clamping structure and a base structure, said clamping structure and base structure being arranged for clamping the workpiece between them, and said workpiece holder having a plurality of inlet fluid passages, said inlet fluid passages being disposed to direct fluid flow to a plurality of selected portions of the workpiece for simultaneously gauging said plurality of flow control channels, a plurality of pressure gauging elements for simultaneously gauging each of said flow control channels as functions of the fluid pressure within said inlet fluid passages, each of said plurality of pressure gauging elements being connected to a corresponding one of said inlet passages, a pressure fluid source connected to said inlet fluid passages, to said pressure gauging means, and to said clamping structure for providing pressure fluid thereto, and a fluidic control circuit connected to said pressure fluid source for controlling said clamping structure.

2. The dimensional gauging system defined in claim 1 wherein a first of said fluid passages is disposed within said clamping structure and a second of said fluid passages is disposed within said base structure.

3. The dimensional gauging system defined in claim 1 wherein said base structure and said clamping structure include sealing elements, said sealing elements forming fluid tight seals against selected portions of the workpiece and between said fluid passages when the workpiece is clamped between said base structure and said clamping structure.

4. The dimensional gauging system defined in claim 1 wherein said clamping structure comprises a pressure fluid cylinder and a plunger slidably mounted in said pressure fluid cylinder, said pressure fluid cylinder being connected to said source of pressure fluid and the position of said plunger being responsive to the fluid pressure within said cylinder, and said plunger having a fluid passage disposed therein, said fluid passage being disposed to direct fluid flow to one of said portions of the workpiece when the workpiece is clamped between said clamping structure and said base structure.

5. The dimensional gauging system defined in claim 1 wherein said fluidic control circuit comprises a fluidic logic element and a fluid valve, said fluidic logic element including a plurality of sensors releasing pressure fluid to the atmosphere and being responsive to the blocking and unblocking of said sensors, said fluid valve being connected to said source of pressure fluid and controlling the flow of pressure fluid to said clamping structure, and said fluidic logic element being fluidically connected to said fluid valve and controlling said valve in accordance with the blocking and unblocking of said sensors.

6. The dimensional gauging system defined in claim 1 wherein said pressure gauging means comprises a plurality of reference channels, each of said reference channels corresponding to a fluid passage of said workpiece holder, a plurality of fluid valves, one each of said valves connected to each of said reference channels for controlling the fluid pressure within the corresponding reference channel, and a plurality of differential pressure gauges, one each of said gauges connected between each said reference channel and the fluid passage corresponding to that reference channel for registering the pressure differential therebetween.

7. A dimensional gauging system for gauging selected dimensions of a workpiece comprising:

a workpiece holder adapted to receive a workpiece having a plurality of dimensions to be simultaneously gauged, said workpiece holder including a base structure and a clamping structure which include sealing elements, said sealing elements forming fluid tight seals against selected portions of the workpiece and between said fluid passages when the workpiece is clamped between said base structure and said clamping structure said workpiece holder also having a plurality of inlet fluid passages, said fluid inlet passages disposed to direct fluid flow to different portions of the workpiece for simultaneously gauging said plurality of selected dimensions thereof, a plurality of pressure gauging elements for simultaneously gauging each of said selected dimensions as functions of the fluid pressures in said fluid passages, each of said plurality of pressure gauging elements being connected to a corresponding one of said inlet passages, and a pressure fluid source connected to said inlet fluid passages for providing pressure fluid thereto.

8. A dimensional gauging system for gauging selected dimensions of a workpiece comprising:

a workpiece holder adapted to receive a workpiece having a plurality of dimensions to be simultaneously gauged, said workpiece holder having a plurality of inlet fluid passages, said fluid inlet passages disposed to direct fluid flow to different portions of the workpiece for simultaneously gauging said plurality of selected dimensions thereof, pressure gauging means for simultaneously gauging said selected dimensions as functions of the fluid pressures in said fluid passages, said pressure gauging means comprising a plurality of reference channels, each of said reference channels corresponding to a fluid passage of said workpiece holder, a plurality of fluid valves, one each of said valves connected to each of said reference channels for controlling the fluid pressure within the corresponding reference channel, and a plurality of differential pressure gauges, one each of said gauges connected between each said reference channel and the fluid passage corresponding to that reference channel for registering the pressure differential therebetween, and a pressure fluid source connected to said fluid passages for providing pressure fluid thereto.

9. A dimensional gauging system for gauging selected dimensions of a workpiece comprising:

a workpiece holder adapted to receive a workpiece having a plurality of dimensions to be simultaneously gauged, said workpiece holder having a plurality of inlet fluid passages, said fluid inlet passages disposed to direct fluid flow to different portions of the workpiece for simultaneously gauging said plurality of selected dimensions thereof, said workpiece holder including a base structure and a clamping structure which include sealing elements, said sealing elements forming fluid tight seals against selected portions of the workpiece and bewteen said fluid passages when the workpiece is clamped between said base structure and said clamping structure, pressure gauging means for simultaneously gauging said selected dimensions as functions of the fluid pressures in said fluid passages, and a pressure fluid source connected to said fluid passages for providing pressure fluid thereto, said clamping structure comprising a pressure fluid cylinder and a plunger slidably mounted in said pressure fluid cylinder, said pressure fluid cylinder being connected to said source of pressure fluid and the position of said plunger being responsive to the fluid pressure within said cylinder, and said plunger having a fluid passage disposed therein, said fluid passage being disposed to direct fluid flow to one of said portions of the workpiece when the workpiece is clamped between said clamping structure and said base structure.

10. A pneumatic dimensional gauging system for simultaneously gauging a plurality of flow control channels of a workpiece comprising:

a workpiece holder having a plurality of inlet passages and an exhaust passage disposed therein, said holder including a pneumatic clamping structure and a base structure arranged for clamping the workpiece between them, said inlet passages being disposed to direct fluid flow through the flow control channels of the workpiece for pneumatically gauging the dimensions thereof, sealing elements affixed to said clamping structure and said base structure for forming fluid tight seals against selected portions of the workpiece and between said inlet passages when the workpiece is clamped in said holder, a plurality of pressure gauging elements for simultaneously gauging each of said flow control channels, each of said plurality of pressure gauging elements being connected to a corresponding one of said inlet passages and including a reference channel, a control valve, and a differential pressure gauge, said control valve being connected to said reference channel and controlling the fluid flow within said reference channel and said differential pressure gauge being connected between said reference channel and the corresponding one of said inlet passages, said pressure gauging elements simultaneously gauging the dimensions of said plurality of flow control channels as functions of the pressure differentials between said reference channels and said inlet passages, a common source of pressure fluid connected to said inlet passages, to said reference channels and to said pneumatic clamping structure, and fluidic control means connected between said source and said clamping structure.

11. The dimensional gauging system defined in claim 10 wherein said fluidic control means comprises a fluidic logic element and a fluid valve, said fluidic logic element including a plurality of sensors releasing pressure fluid to the atmosphere and being responsive to the blocking and unblocking of said sensors, said fluid valve being connected to said source of pressure fluid and controlling the flow of pressure fluid to said clamping structure, and said fluidic logic element being fluidically connected to said fluid valve and controlling said valve in accordance with the blocking and unblocking of said sensors.

12. The dimensional gauging system defined in claim 11 wherein said clamping structure comprises a pressure fluid cylinder and a plunger slidably mounted in said pressure fluid cylinder, said pressure fluid cylinder being connected to said source of pressure fluid and the position of said plunger being responsive to the fluid pressure within said cylinder, and said plunger having a fluid passage disposed therein, said fluid passage being disposed to direct fluid flow to one of said selected one of said flow control channels of the workpiece when the workpiece is clamped between said clamping structure and said base structure.

References Cited

UNITED STATES PATENTS

| 2,775,117 | 12/1956 | Aller | 73—37.8 |
| 2,955,350 | 10/1960 | Gardiner | 73—37.8XR |
| 3,050,985 | 8/1962 | Roetter | 73—37.8 |
| 2,182,368 | 12/1939 | Adair | 73—4 |
| 2,861,451 | 11/1958 | Emmons III | 73—38 |
| 3,271,997 | 9/1966 | Horne et al. | 73—37.7 |
| 3,423,990 | 1/1969 | Martin | 73—45.1 |
| 3,426,582 | 2/1969 | McArthur et al. | 73—45.1 |

FOREIGN PATENTS

| 50,334 | 8/1966 | Germany | 33—Air Digest |

S. CLEMENT SWISHER, Primary Examiner

W. A. HENRY II, Assistant Examiner